US008315676B2

(12) United States Patent
Chhabra et al.

(10) Patent No.: US 8,315,676 B2
(45) Date of Patent: *Nov. 20, 2012

(54) BEACON MISS PREVENTION IN POWER SAVE MODES USING TIMING SYNCHRONIZATION FUNCTION

(75) Inventors: Kapil Chhabra, Milpitas, CA (US); Sandesh Goel, Noida (IN); Zhenyu Zhang, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,958

(22) Filed: Aug. 22, 2011

(65) Prior Publication Data

US 2011/0305264 A1  Dec. 15, 2011

Related U.S. Application Data

(63) Continuation of application No. 12/060,613, filed on Apr. 1, 2008, now Pat. No. 8,005,515.

(60) Provisional application No. 60/910,114, filed on Apr. 4, 2007.

(51) Int. Cl.
*H04B 1/38* (2006.01)

(52) U.S. Cl. ..... 455/574; 455/13.4; 455/522; 455/127.5; 455/343.1; 455/343.5

(58) Field of Classification Search .................. 455/574, 455/13.4, 522, 127.5, 343.1, 343.5
See application file for complete search history.

(56) References Cited

U.S. PATENT DOCUMENTS

| | | | |
|---|---|---|---|
| 5,845,204 | A | 12/1998 | Chapman et al. |
| 2003/0193895 | A1 | 10/2003 | Engwer et al. |
| 2005/0036469 | A1 | 2/2005 | Wentink |
| 2006/0056377 | A1 | 3/2006 | Wu et al. |
| 2006/0159053 | A1 | 7/2006 | Donovan |
| 2006/0187866 | A1 | 8/2006 | Werb et al. |

FOREIGN PATENT DOCUMENTS

EP  1684466  7/2006

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999;531 pages.

(Continued)

*Primary Examiner* — Nimesh Patel

(57) ABSTRACT

An integrated circuit including ; transceiver module, a beacon miss module, and a control module. The transceiver module transitions, at predetermined times, a wireless network device from an inactive mode to an active mode. The predetermined times are based on a dock used by the wireless network device while operating, in the inactive mode. The beacon miss module counts a number of delivery traffic indication message (DM) beacons missed by the transceiver module during each of a first predetermined period and a second predetermined period. The first predetermined period is shorter than the second predetermined period. The predetermined times do not occur during either of the first predetermined period or the second predetermined period. The control module adjusts the predetermined times based on the number of the DTIM beacons missed by the transceiver module during each of the first predetermined period and the second predetermined period.

11 Claims, 10 Drawing Sheets

OTHER PUBLICATIONS

IEEE P802.11 g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11 n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11 hTM_2003 [Amendmt to IEEE Std 802.11 TM, '99 Edition (Reaff 03) as amended by IEEE Stds 802.11a™ -99, 802.11b™ -'99, 802.11b™ -'99/Cor 1-2001, 802.11d™_2001, 802.11g™_2003]; IEEE Std for Info. technology—Telecomms and info. exchange between systems—Local and metropolitan area networks—Specific reqs; Part 11: Wireless LAN Medium Access Control (MAC) & Physical Layer (PHY) specs; Amendment 5: Spectrum and Transmit Power Mngmnt Extensions in the 5Ghz band in Europe; IEEE ; LAN/MAN stds Committee; Oct. 14, 2003; 75pg.

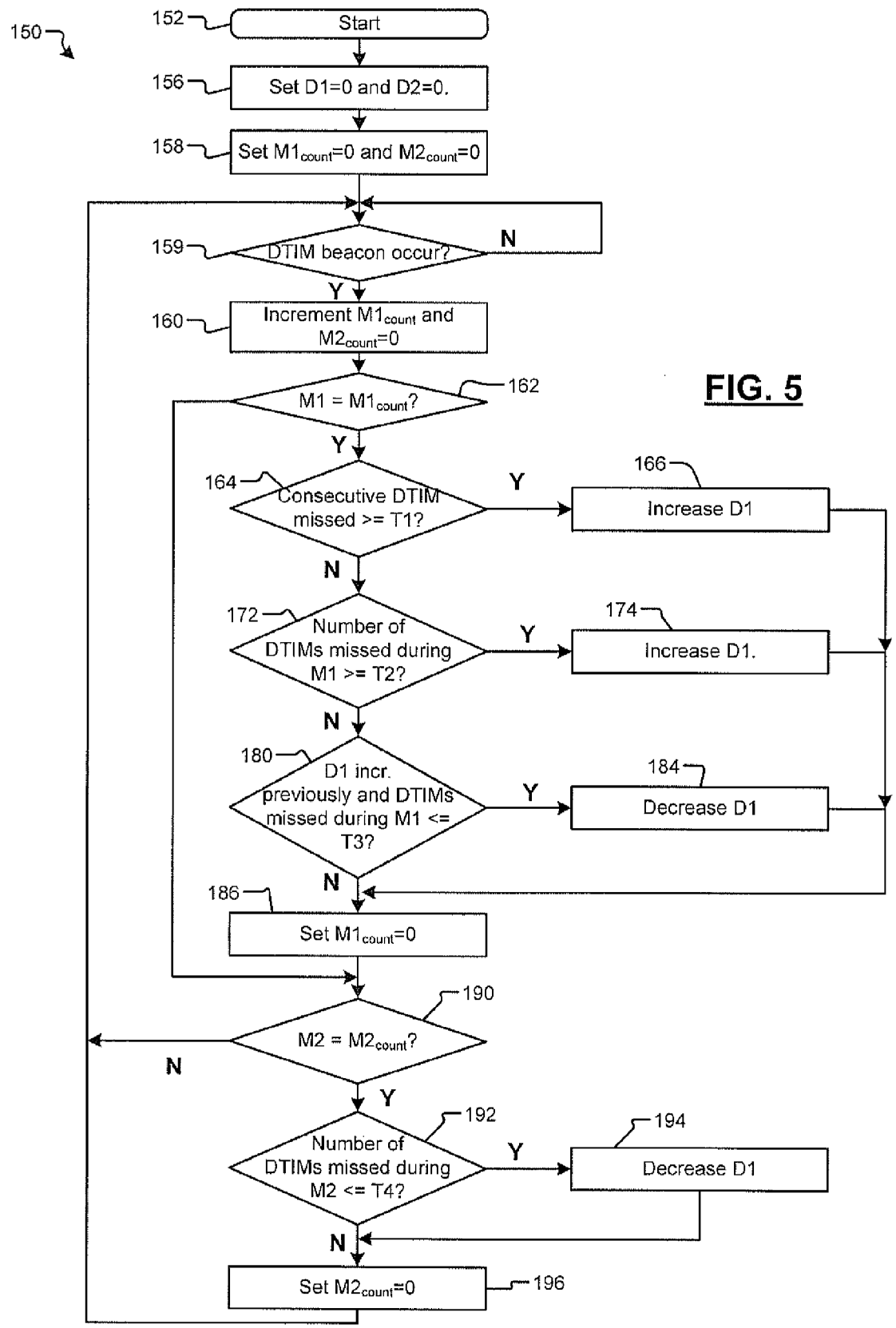

BEACON MISS PREVENTION IN POWER SAVE MODES USING TIMING SYNCHRONIZATION FUNCTION

CROSS-REFERENCE TO RELATED APPLICATIONS

This present disclosure is a continuation of U.S. application Ser. No. 12/060,613, filed on Apr. 1, 2008, now U.S. Pat. No. 8,005,515 which claims priority under 35 U.S.C. §119(e) to U.S. Provisional Application No. 60/910,114, filed on Apr. 4, 2007.

FIELD

The present disclosure relates to wireless network devices, and more particularly to reducing power consumption of wireless network devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless network devices such as client stations operate in an ad-hoc mode or an infrastructure mode as shown in FIGS. 1 and 2, respectively. In the ad-hoc mode, each client station 10-1, 10-2, . . . , and 10-N (collectively client stations 10) communicates directly with other client stations without requiring an access point (AP). In the infrastructure mode, each client station 20-1, 20-2, . . . , and 20-M (collectively client stations 20) communicates with other client stations through an AP 24. The AP 24 may provide a connection to a network 26, a server 28, and/or Internet 30.

Referring now to FIG. 3, the AP 24 transmits beacons at a beacon interval. Every $N^{th}$ beacon is a delivery traffic indication message (DTIM) beacon, where N is an integer greater than or equal to 1. The DTIM beacon is followed by buffered broadcast and multicast frames transmitted by the AP 24 to the client stations 20.

Generally, the AP 24 and the client stations 20 do not exchange data after each DTIM beacon. Accordingly, client stations 20 may operate in two modes: an active mode and an inactive (or sleep) mode. When the AP 24 and the client stations 20 exchange data, the client stations 20 may operate in the active mode. On the other hand, when the AP 24 and the client stations 20 do not exchange data, the client stations 20 may operate in the inactive mode to conserve power. Components of the client station are shut down during the inactive mode. An inactive mode clock and a wake up module determine when to transition back to the active mode. Based on the DTIM beacon interval, the client stations 20 may determine the amount of time to remain in the inactive mode before waking up to receive the next DTIM beacon.

SUMMARY

In general, in one aspect, the present disclosure describes an integrated circuit comprising a transceiver module, a beacon miss module, and a control module. The transceiver module is configured to, at predetermined times, transition a wireless network device from an inactive mode to an active mode. The beacon miss module is configured to count a number of delivery traffic indication message (DTIM) beacons missed by the transceiver module during each of a first predetermined period and a second predetermined period, wherein the first predetermined period is shorter than the second predetermined period. The control module is configured to adjust the predetermined times at which the wireless network device is transitioned from the inactive mode to the active mode based on the number of the DTIM beacons missed by the transceiver module during each of i) the first predetermined period and ii) the second predetermined period.

In general, in another aspect, the present disclosure describes a method includes, at predetermined times, transitioning a wireless network device from an inactive mode to an active mode, in which the predetermined times are based on a clock used by the wireless network device while operating in the inactive mode. The method further includes counting a number of delivery traffic indication message (DTIM) beacons missed during each of a first predetermined period and a second predetermined period, in which the first predetermined period is shorter than the second predetermined period. The method further includes adjusting the predetermined times at which the wireless network device is transitioned from the inactive mode to the active mode based on the number of the DTIM beacons missed during each of i) the first predetermined period and the second predetermined period.

In another feature, the systems and methods described above are implemented by a computer program executed by one or more processors. The computer program can reside on a computer readable medium such as but not limited to memory, non-volatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 illustrates a method for determining a first correction value D1 that compensates for hardware/software delays;

DETAILED DESCRIPTION

Figure 1:
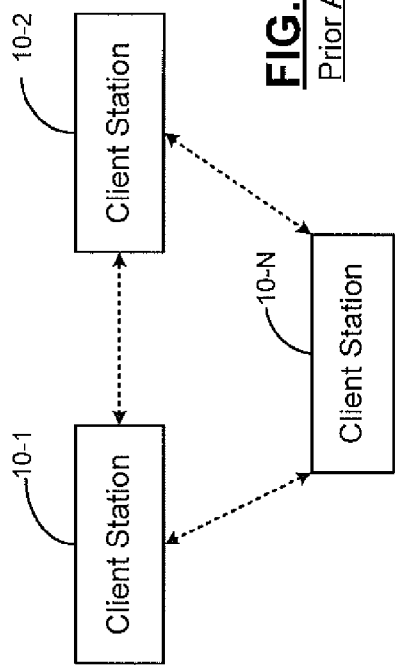
FIG. 1 is a functional block diagram of an exemplary wireless Ethernet network in the ad-hoc mode according to the prior art.
Figure 2:
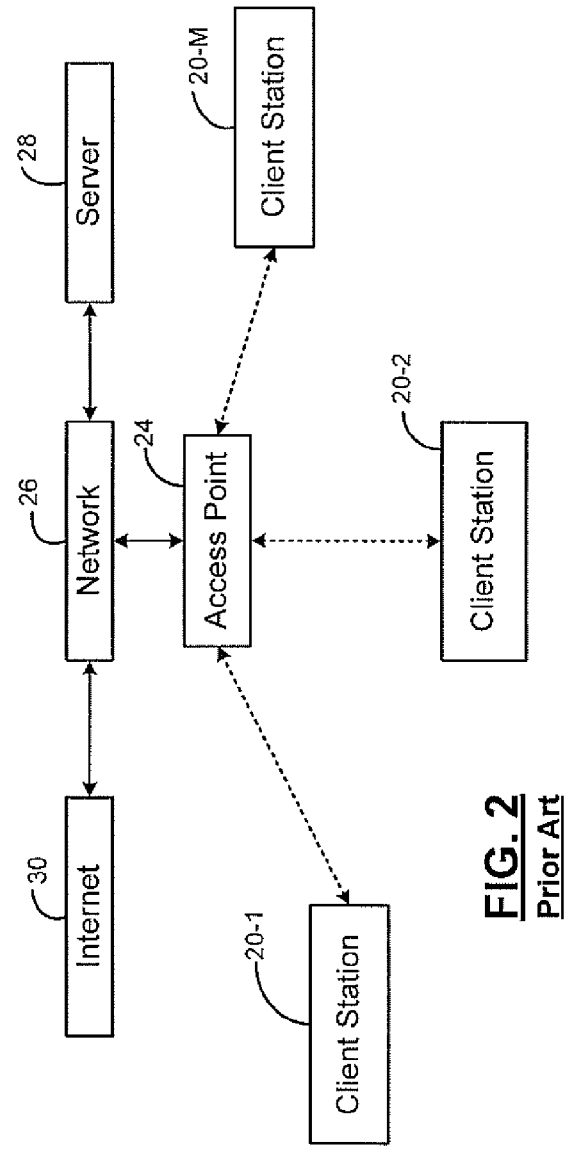
FIG. 2 is a functional block diagram of an exemplary wireless Ethernet network in the infrastructure mode according to the prior art.
Figure 3:
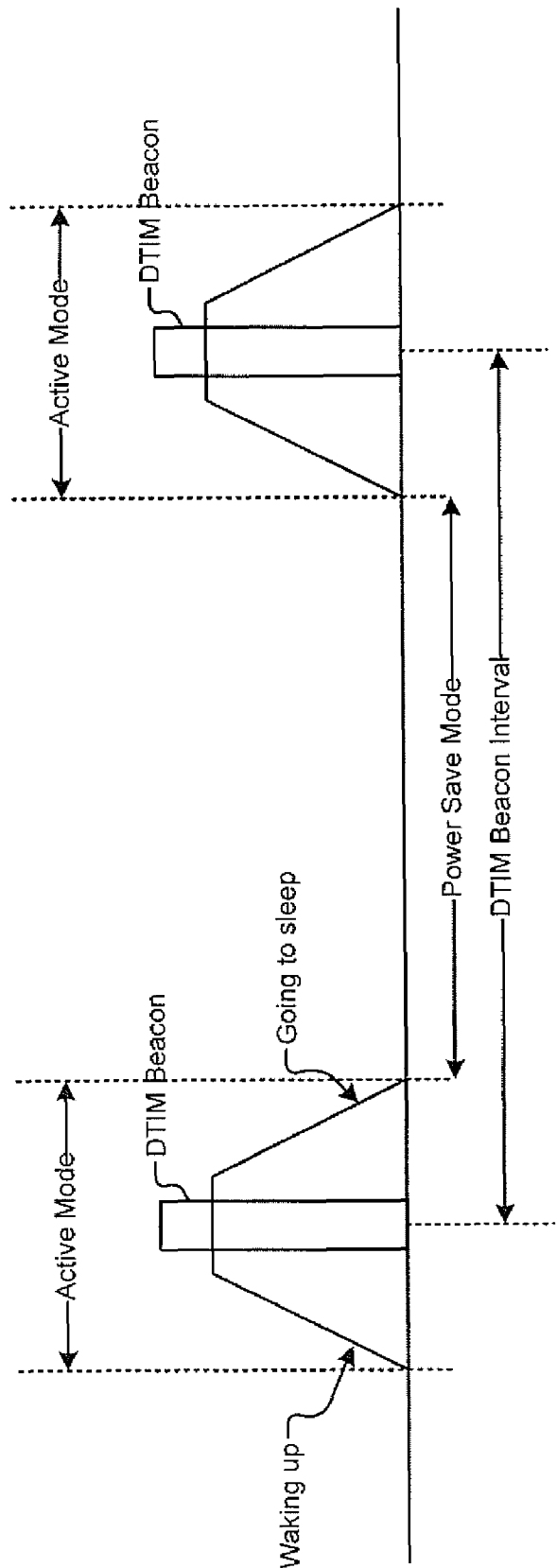
FIG. 3 is an exemplary timing diagram showing active and inactive modes of a wireless Ethernet network device and delivery traffic indication message (DTIM) beacons received during the active mode.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some systems, the client station wakes up a predetermined time before the DTIM beacon is expected. This period, which is referred to as pre-Target Beacon Transmission Time (pre-TBTT), is typically a fixed value that accounts for inactive mode clock errors and any hardware/software delays associated with preparing the client station to receive the DTIM beacon.

This approach requires manual calibration for each implementing system and software version. Furthermore, there are part-to-part variations, temperature-based differences and voltage supply-based differences that tend to cause variable inactive mode clock errors. In other words, a pre-TBTT value that works for one system may not be optimal for another system. Furthermore, calibration delays of the radio frequency (RF) module may vary from one chip to another. The calibration delays may also vary with temperature differences and/or channel conditions.

Because the pre-TBTT value assumes worst-case inactive mode clock errors, the client station may wake up too early before the DTIM beacon. As a result, active mode time and power dissipation of the client station increases without any significant operational benefits.

In the present disclosure, an adjusted pre-TBTT period is calculated during operation based on first and second correction values that compensate for hardware/software delays and drift of the inactive mode clock, respectively. As a result, more accurate pre-TBTT values can be used and power consumption can be optimized.

Figure 4A:
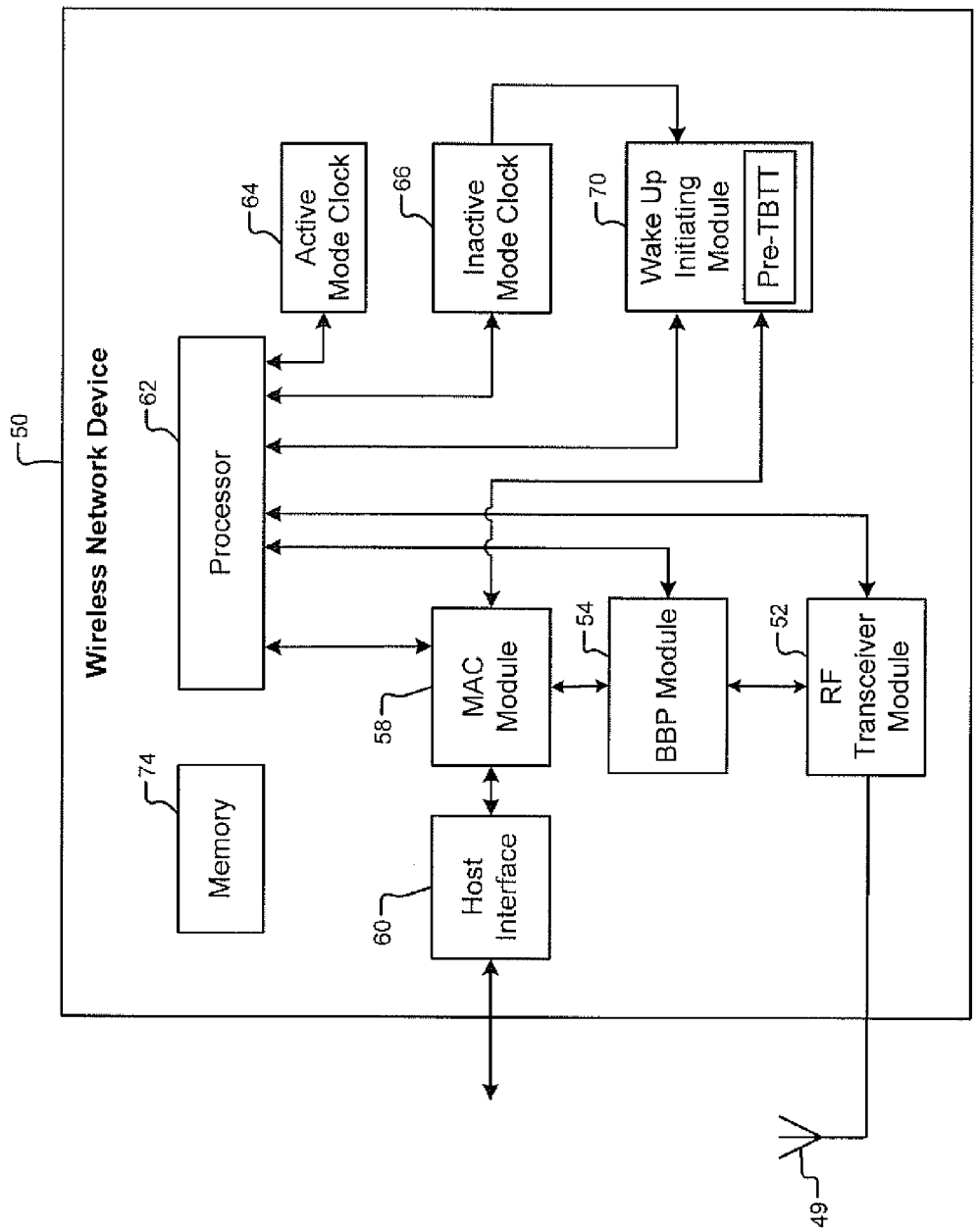
FIG. 4A is a functional block diagram of an exemplary client station including a wake-up initiating module and a medium access control (MAC) module according to the present disclosure.

Referring now to FIG. 4A, a wireless network device 50 such as a client station according to the present disclosure is shown. The wireless network device 50 includes a radio frequency (RF) transceiver module 52 that transmits and receives wireless data over a medium. The wireless data may be arranged in packets, frames and/or any other format. The RF transceiver module 52 includes an antenna 49.

A baseband processing module 54 converts RF signals received by the RF transceiver module 52 to baseband signals. The baseband processing module 54 also converts baseband signals from a medium access control (MAC) module 58 to RF frequency for wireless transmission. The MAC module 58 receives the baseband signals, communicates with a host interface 60 and provides an interface to the physical layer, and controls operation of the wireless network device 50.

The wireless network device 50 further includes a processor 62 that performs processing for the wireless network device 50. An active mode clock 64 generates clock signals during the active mode and provides a high accuracy clock. The active mode clock 64 may be connected to a clock based on an external crystal oscillator (not shown) to provide a relatively precise clock during active mode operation.

An inactive mode clock 66 generates clock signals during the inactive mode. The inactive mode clock 66 may dissipate less power than the active mode clock 64. The inactive mode clock 66 may be generated based on an external crystal oscillator and/or an on-chip oscillator such as a ring oscillator. The inactive mode clock 66 tends to be less precise over time than the active mode clock 64.

A wake-up initiating module 70 wakes up the wireless network device 50 a predetermined period (hereinafter, an adjusted pre-TBTT period or pre-TBTT$_{adj}$) before the next expected DTIM beacon. In other words, the client station remains in the inactive mode for a period equal to the DTIM beacon interval minus the pre-TBTT value. The wake-up initiating module 70 wakes up the wireless network device 50 at the pre-TBTT period before the DTIM beacon interval as determined by the inactive mode clock 66. The MAC module 58 or another module of the client station may selectively adjust the pre-TBTT period from one DTIM beacon to another DTIM beacon as described herein.

The wireless network device 50 may also include memory 74, which may include random access memory (RAM), read-only memory (ROM), volatile memory, nonvolatile memory, cache, flash memory and/or any other memory.

The processor 62 may wake up the MAC module 58 and power on different components of the client station (such as, for example only, the RF transceiver module 52). During wakeup, the RF transceiver module 58 may be calibrated. Software execution delays and calibration delays of the RF transceiver module 58 may vary. If the pre-TBTT period is too short, the wireless network device wakes up after the DTIM beacon occurs. If the pre-TBTT period is too long, the wireless network device 50 is active too long and dissipates too much power.

The active and inactive mode clocks 64 and 66 may be generated using an external crystal oscillator. Clocks based on crystal oscillators tend to be relatively stable. If both clocks are based on the crystal oscillator, the inactive mode clock can be still be adjusted as described herein.

However, in some applications, the inactive mode clock 66 may be based on signals generated by an on-chip oscillator (independently from a crystal oscillator). For example, an on-chip ring oscillator may be used, which may be less stable that the crystal oscillator-based clock. The ring oscillator may be used because it can be integrated on-chip and tends to consume less power. For example only, the inactive mode clock 66 based on a ring oscillator may have a relatively large part per million (PPM) error (for example>15000 PPM). These variable errors should be accounted for when adjusting the pre-TBTT value.

The present disclosure adjusts the pre-TBTT value by calculating and applying two corrections. A first correction value D1 accounts for hardware/software delays. A second correction value D2 accounts for inactive mode clock drift.

The number of DTIM beacons that are missed are monitored and used to adapt the first correction value D1. Two monitoring intervals may be used, M1 and M2 where M1<M2. M1 and M2 are cumulative counts of DTIM beacons that are sent by the AP. The first correction value D1 is increased when at least T1 consecutive DTIM beacons are missed or when at least T2 DTIM beacons are missed during M1. The first correction value D1 is decreased when less than T3 DTIM beacons are missed during M2 or when the first correction value D1 was increased previously and less than T3 DTIM beacons are missed during M1. The thresholds T1, T2 and T3 may be set for a particular implementation.

The second correction value D2 accounts for drift of the inactive mode clock 66. The present disclosure may measure the drift based on the clock of the AP. More particularly, the AP transmits a timestamp $TSF_{AP}$ in DTIM beacon/probe responses. The client station also generates local timestamps or $TSF_{CLIENT}$ based on the local clocks. The client station may monitor a difference between $TSF_{CLIENT}$ and $TSF_{AP}$ and generate the second correction value D2 based thereon. For example only, the second correction value D2 can be based on an average of differences between $TSF_{CLIENT}$ and $TSF_{AP}$ every DTIM beacon. An exponential average or other functions that are based on $TSF_{CLIENT}$ and $TSF_{AP}$ may be used.

If the DTIM beacon is missed, there are several options. The client station can remain in the active mode until the next DTIM beacon. This approach tends to waste power since the client station remains on without any benefit.

Alternately, when the DTIM beacon is missed, the client station can return to the inactive mode and wake up before the next DTIM beacon. This approach consumes less power than remaining in the active mode until the next DTIM beacon. However, this approach accumulates inactive mode clock error over two periods. Using this approach, when the DTIM beacon has not been received during a predetermined period, the client station can assume that the beacon has been missed. The client station transitions to the inactive mode and then wakes up for the next DTIM beacon.

In another approach, the present disclosure may force clock sync by sending a unicast probe request packet (or timestamp request) to the AP when the client station fails to receive a DTIM beacon within a predetermined period after wake-up. For example only, the predetermined period may be based on (1 maximum transfer unit (MTU) at lowest rate+ priority inter-frame space (PIFS)+Beacon Transmit Time+ delta). A typical period may be equal to approximately 20 ms, although other periods can be used. The AP's probe response includes the $TSF_{AP}$, which can be used to determine drift.

The client station adjusts the pre-TBTT value by adding the first correction value D1 and the second correction value D2 to the pre-TBTT period. The first and second correction values D1 and D2 can be zero, positive or negative.

Figure 4B:
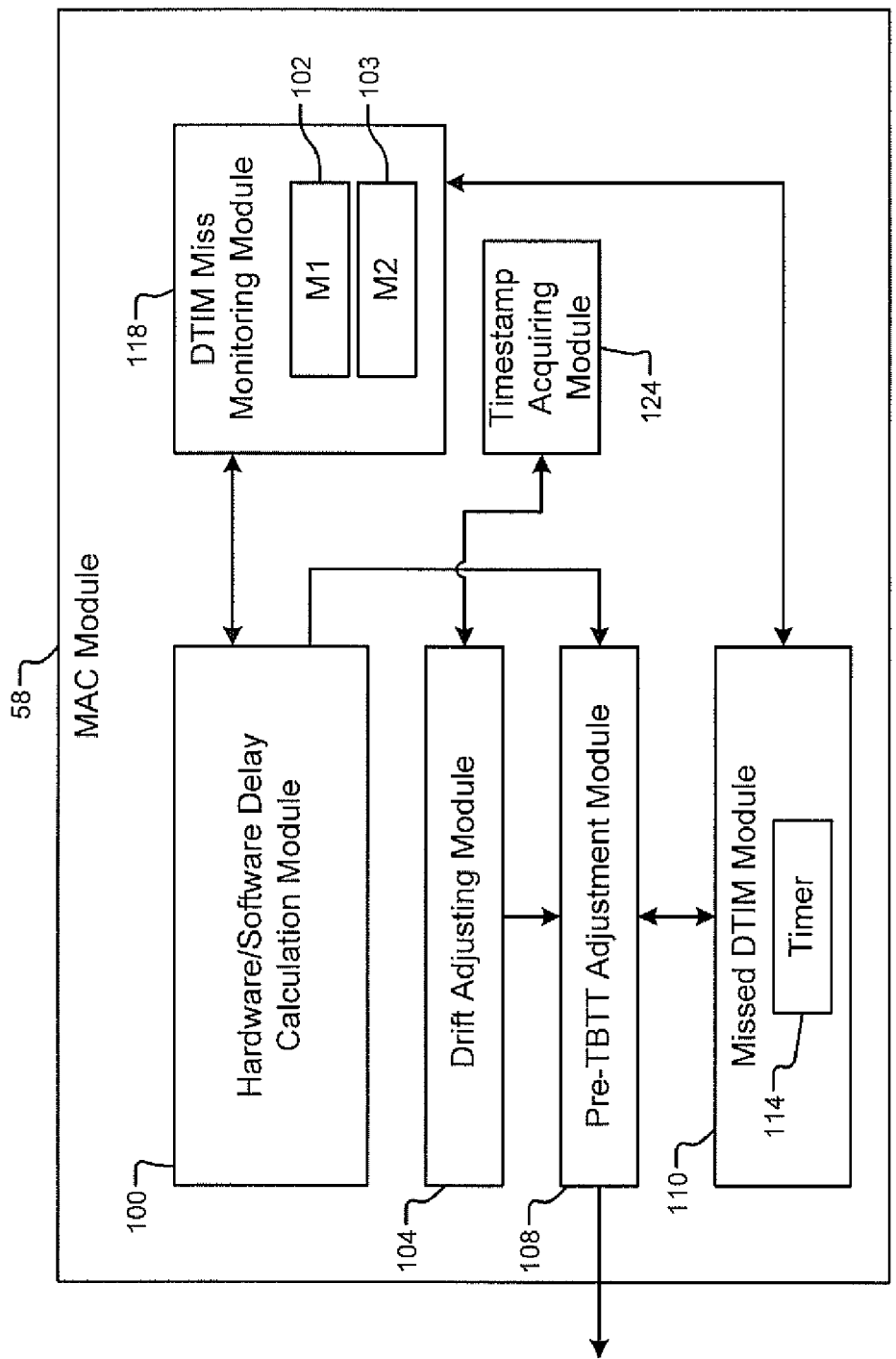
FIG. 4B is a functional block diagram of the MAC module of FIG. 4A in further detail.

Referring to FIG. 4B, the MAC module 58 is shown in further detail. The MAC module 58 includes a hardware/software delay calculation module 100 that calculates the first correction value D1. A drift adjusting module 104 calculates the second correction value D2. A pre-TBTT adjustment module 108 adjusts the pre-TBTT value based on the first and second correction values D1 and D2, respectively. A missed DTIM module 110 handles situations when the wireless network device 50 wakes up from the inactive mode and misses the DTIM beacon.

A DTIM miss monitoring module 118 monitors for DTIM beacons after the active mode is initiated. The DTIM miss monitoring module 118 sends information relating to DTIM beacon misses to the hardware/software delay calculation module 100. The DTIM miss monitoring module 118 may include first and second timers 102 and 104 that determine first and second counts M1 and M2, respectively, of DTIM beacons sent by the AP. A timestamp acquiring module 124 acquires a timestamp $TSF_{AP}$ from the AR As can be appreciated, other modules of the wireless network device 50 may implement some or all of the modules of 16.

Referring now to FIG. 5, a method 150 for operating the wireless network device 50 is shown. Control begins with step 152. In step 156, the first and second corrections D1 and D2, respectively, are set equal to zero, In step 158, the counts $M1_{count}$ and $M2_{count}$ are reset. In step 159, control determines whether a DTIM beacon was sent by the AP. If false, control returns to step 159. If step 159 is true, control determines whether M1 is equal to $M1_{count}$ in step 162. In step 164, control determines whether the number of consecutive DTIM beacons that are missed is greater than a first threshold T1. If step 164 is true, control increases the first correction value D1 in step 166 and control continues with step 186.

If step 164 is false, control determines whether the number of DTIM beacons missed during the $M1_{count}$ is greater than or equal to a second threshold T2. If step 172 is true, control increases the first correction value D1 in step 174 and control continues with step 186. If step 172 is false, control determines whether the first correction value D1 was previously increased and whether the number of DTIM beacons missed during the $M1_{count}$ is less than or equal to a third threshold T3. If step 180 is true, control decreases the first correction value D1 in step 184 and control continues with step 186. In step 186, control resets the $M1_{count}$.

In step 190, control determines whether the M2 is equal to $M2_{count}$. If step 190 is false, control returns to step 162. If step 190 is true, control continues with step 192 and determines whether the number of DTIM beacons missed during $M2_{count}$ is less than or equal to a fourth threshold T4. In some implementations, T4 can be set equal to T2. If step 192 is true, control decreases the first correction value D1. If step 192 is false, control resets the timer and to and control returns to step 159. As can be appreciated, the increases and decreases to the first and second correction values can be discrete or variable steps.

Figure 6:
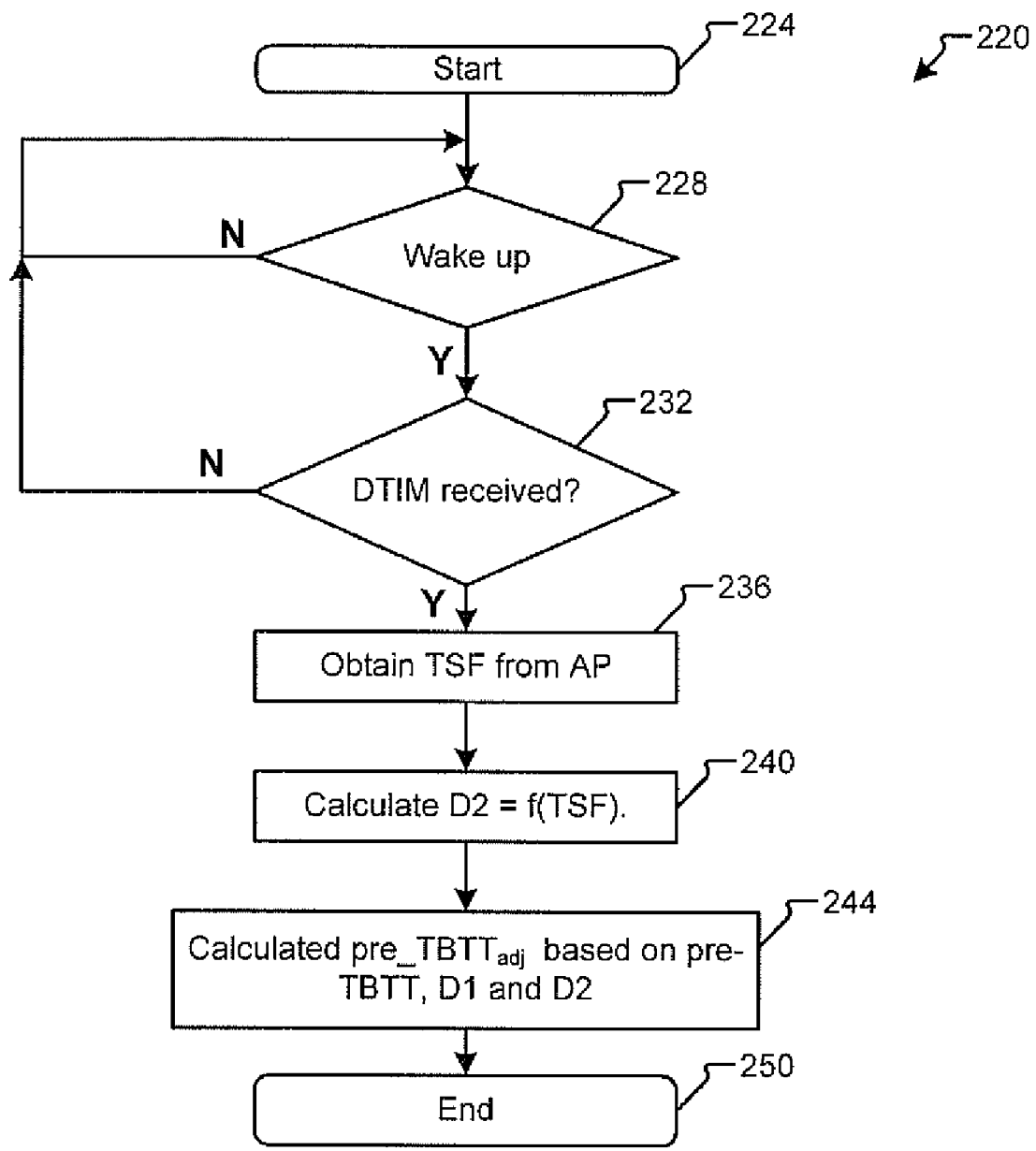
FIG. 6 illustrates a method for calculating a second correction value D2 that compensates for inactive mode clock drift.
Figure 7:
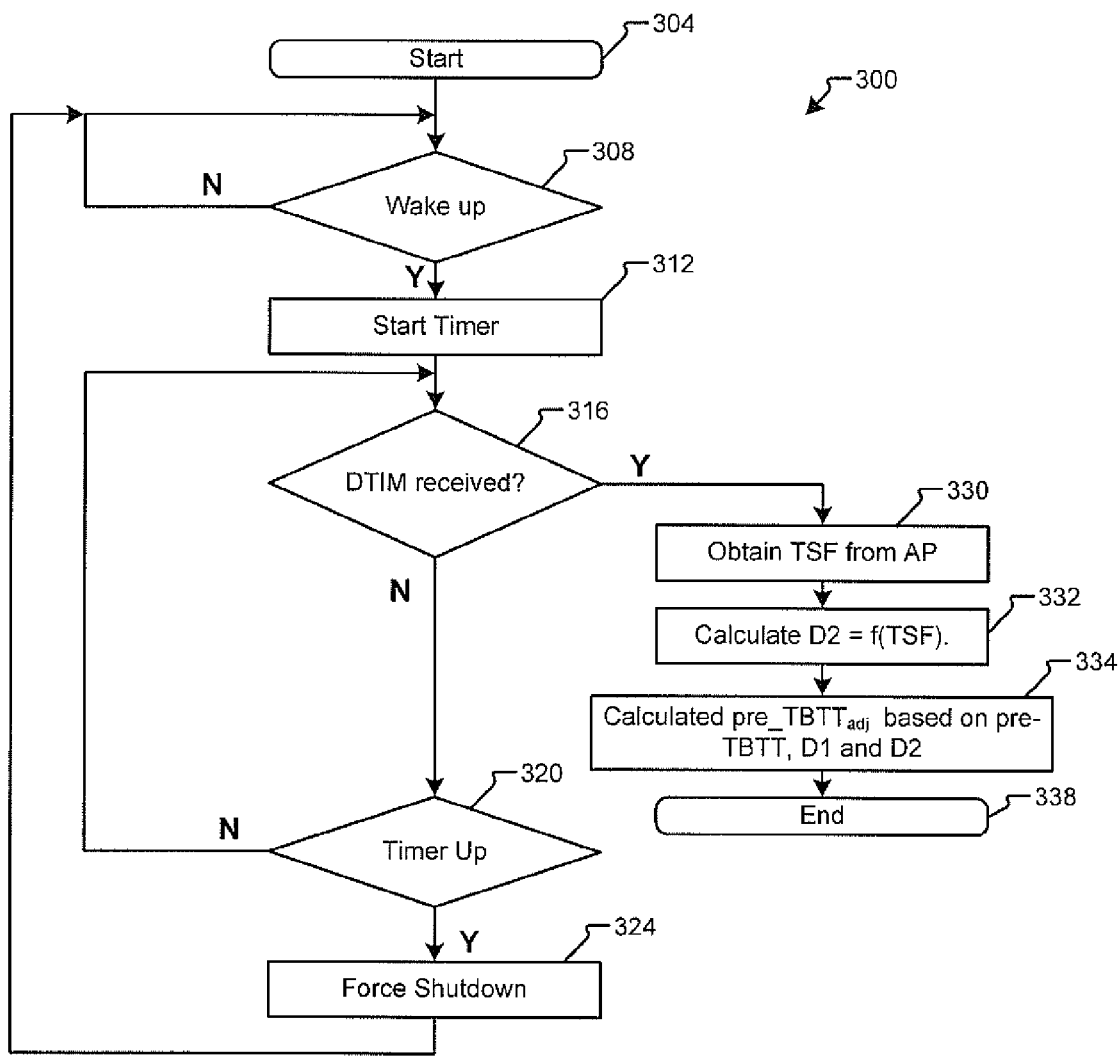
FIG. 7 illustrates an alternative method for controlling the client station when the DTIM beacon is missed.
Figure 8:
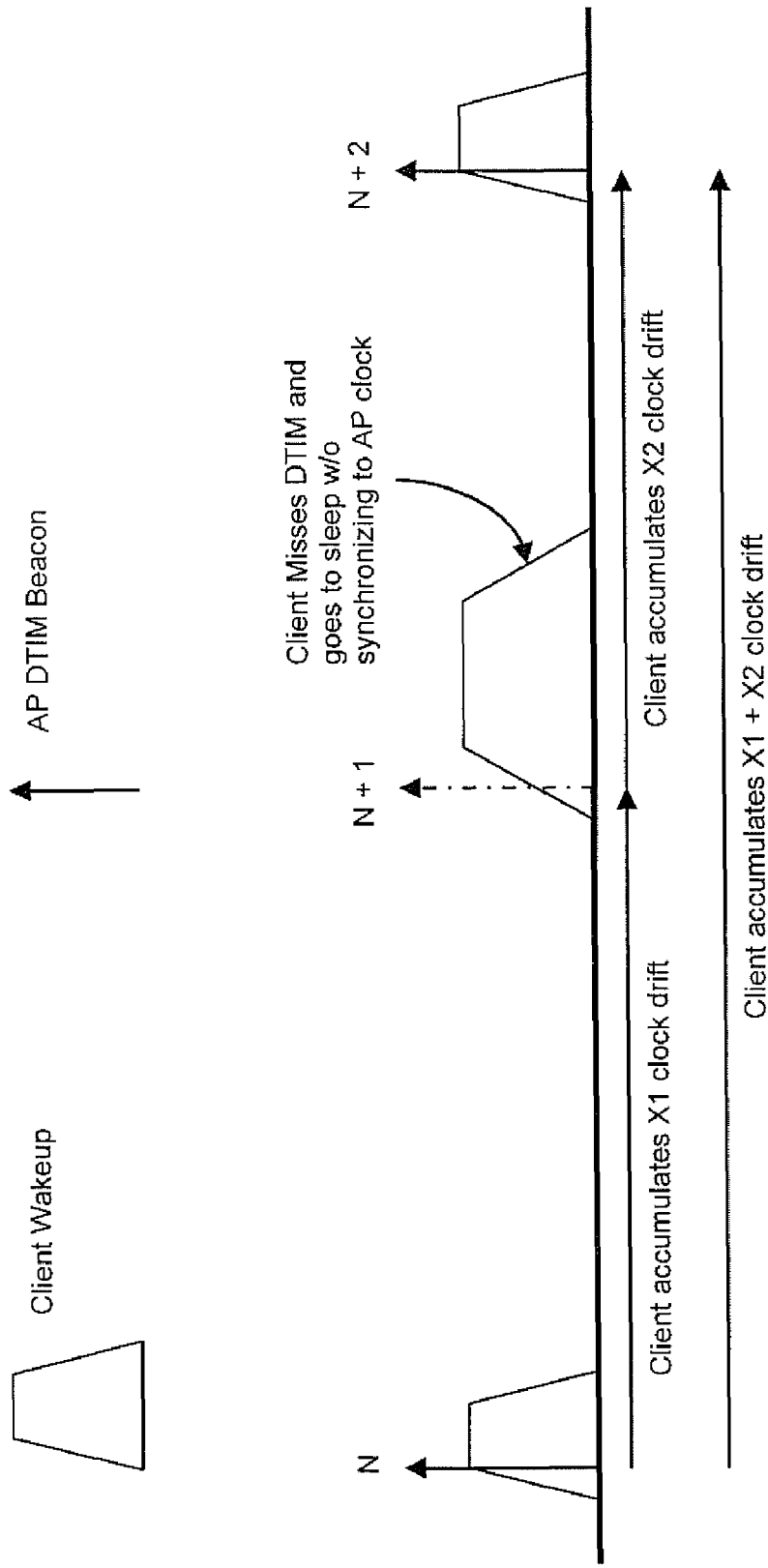
FIG. 8 graphically depicts operation based upon the method of FIG. 7.
Figure 9:
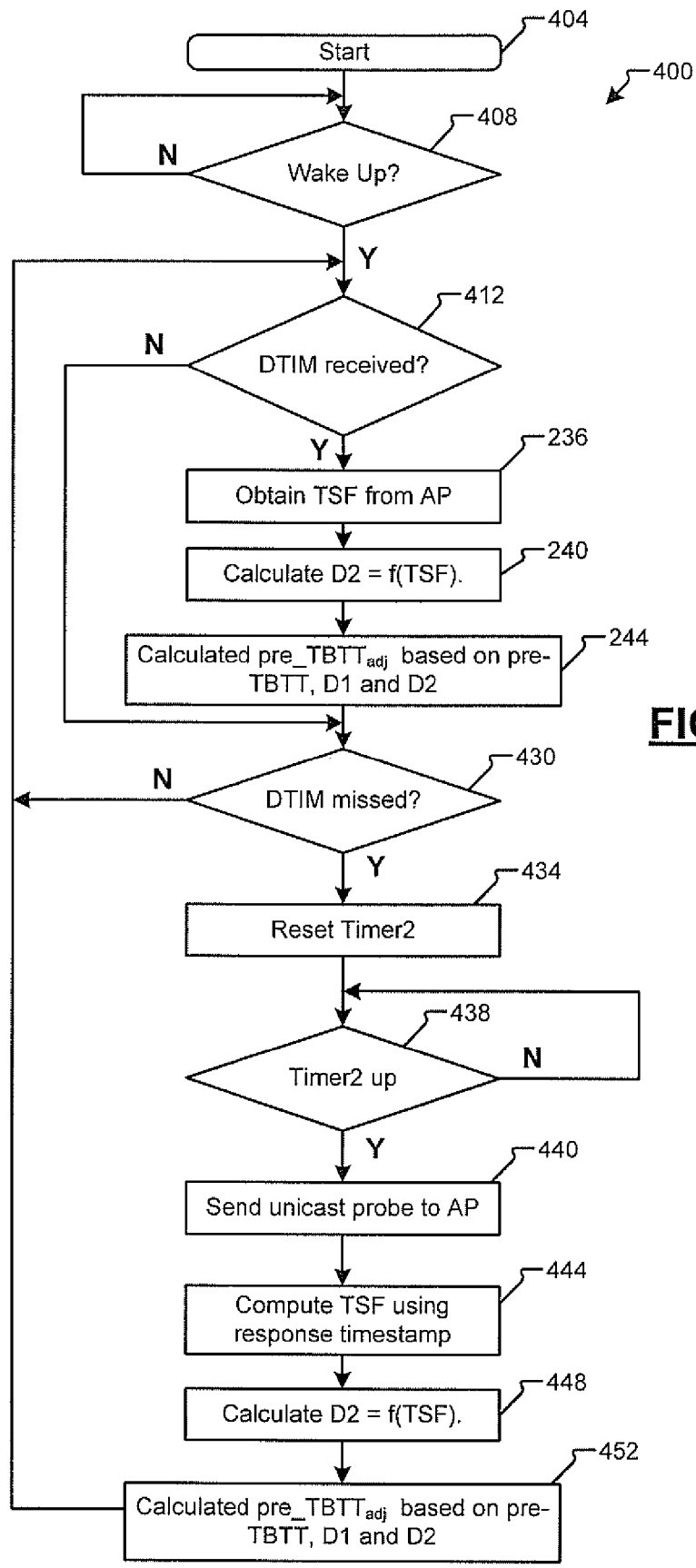
FIG. 9 illustrates an alternative method for controlling the client station when the DTIM beacon is missed.
Figure 10:
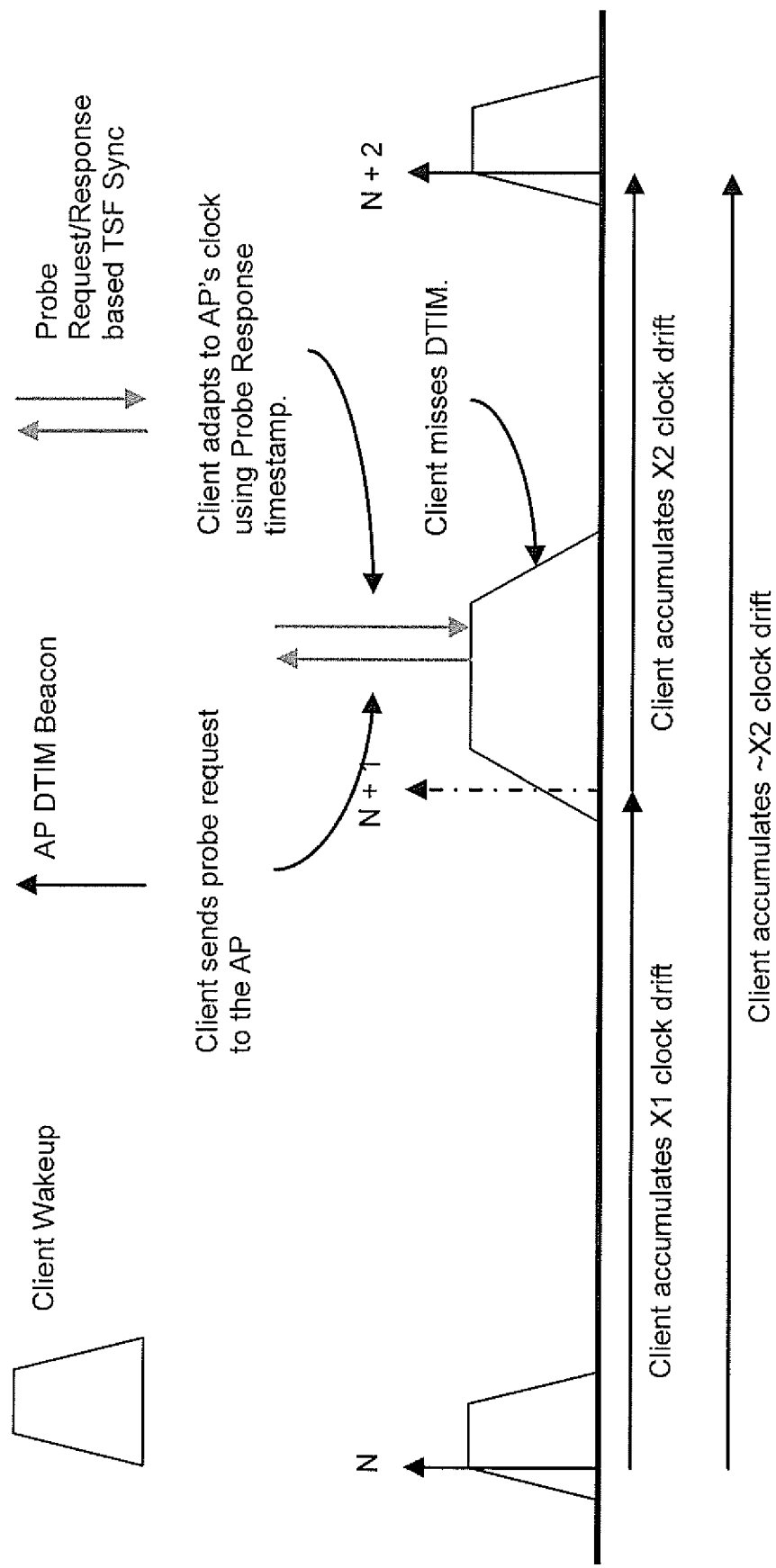
FIG. 10 graphically depicts operation based upon the method of FIG. 9.

In FIGS. 6-9, alternate methods for handling DTIM beacon misses are shown. In FIG. 6, the wireless network device remains on until the next beacon after a DTIM beacon miss. In FIGS. 7 and 8, the wireless network device forces shutdown after a DTIM beacon miss and wakes up for the next DTIM beacon. In FIGS. 9 and 10, the wireless network device sends a request to the AP for a timestamp after the DTIM beacon miss, compensates for drift based on the timestamp, forces shutdown and wakes up for the next DTIM beacon.

Referring now to FIG. 6, a method 220 is shown. The method begins with step 224. In step 228, control determines whether the wireless network device wakes up (e.g., transitions to the active mode). If step 228 is true, control determines whether the DTIM beacon is received. If step 232 is true, control obtains the $TSF_{AP}$ from packets sent by the AP. In step 240, control calculates the second correction value D2 as a function of the $TSF_{AP}$ of one or more DTIM beacons and the local timestamp $TSF_{client}$. In step 244, control calculates an adjusted pre-TBTT value based on a predetermined base or prior pre-TBTT value and the first and second correction values D1 and D2, respectively. The calculation may be a sum of the pre-TBTT+D1+D2. Control ends in step 250.

Referring now to FIGS. 7 and 8, a method 300 is shown. The method begins with step 304 and proceeds to step 308 where control determines whether the wireless network device wakes up (e.g., transitions to the active mode). In step 312, control resets a timer. In step 316, control determines whether the DTIM beacon has been received. If the DTIM beacon has been received, control performs steps 236, 240 and 244 as described above and control ends in step 338. If the DTIM beacon has not been received in step 316, control determines whether the timer is up in step 320. If the timer is up in step 320, control forces a shutdown in step 324 and wakes up for the next DTIM beacon.

Referring now to FIGS. 9 and 10, a method 400 is shown. Control begins with step 404 and proceeds to step 408 where control determines whether the wireless network device wakes up (e.g., transitions to the active mode). If step 408 is true, control determines whether the DTIM beacon has been received in step 412. If step 412 is true, control performs steps 236, 240 and 244 as described above and control ends with step 414.

If step 412 is false, control determines whether the DTIM beacon was missed in step 430. This determination may be made by using a timer as shown in FIG. 7. If step 430 is true, control resets a timer in step 434. In step 438, control determines whether the timer is up. When the timer is up, control continues with step 440 and sends a unicast probe (or timestamp request) to the AP. In step 444, control receives the $TSF_{AP}$ and computes a difference based on the timestamp $TSF_{AP}$ and a local timestamp $TSF_{Client}$. In step 444, control calculates the second correction value based on $TSF_{AP}$ and $TSF_{Client}$, of one or more DTIM beacons. In step 452, control calculates an adjusted pre-TBTT value based on the pre-TBTT value and the first and second correction values D1 and D2, respectively.

The present disclosure reacts relatively quickly to optimize wake up time without oscillating. For example only, values in the flowcharts can be set to $M1_{count}$=5, $M2_{count}$=50, T1=2, T2=3, T3=1.

Those skilled in the art can now appreciate from the foregoing description that the broad teachings of the disclosure can be implemented in a variety of forms. Therefore, while this disclosure includes particular examples, the true scope of the disclosure should be not so limited since other modifications will become apparent to the skilled practitioner upon a study of the drawings, the specification, and the following claims.

What is claimed is:

1. An integrated circuit comprising:
a transceiver module configured to, at predetermined times, transition a wireless network device from an inactive mode to an active mode, and wherein the predetermined times are based on a clock used by the wireless network device while operating in the inactive mode;
a beacon miss module configured to count a number of delivery traffic indication message (DTIM) beacons missed by the transceiver module during each of a first predetermined period and a second predetermined period, wherein the first predetermined period is shorter than the second predetermined period, and wherein the predetermined times at which the wireless network is transitioned from the inactive mode to the active mode do not occur during either of the first predetermined period or the second predetermined period; and
a control module configured to adjust the predetermined times at which the wireless network device is transitioned from the inactive mode to the active mode based on the number of the DTIM beacons missed by the transceiver module during each of i) the first predetermined period and ii) the second predetermined period.

2. The integrated circuit of claim 1, wherein:
the transceiver module is configured to receive a first timestamp from a remote device; and
the control module is configured to compensate for a drift in the clock by adjusting, based on the first timestamp, the predetermined times at which the wireless network device is transitioned from the inactive mode to the active mode.

3. The integrated circuit of claim 2, wherein the control module is configured to adjust the predetermined times at which the wireless network device is transitioned from the inactive mode to the active mode based on a difference between the first timestamp and a second timestamp, wherein the second timestamp is based on a local clock of the wireless network device.

4. The integrated circuit of claim 1, wherein the control module is configured to increase the predetermined times at which the wireless network device is transitioned from the inactive mode to the active mode in response to:
a consecutive number of the DTIM beacons missed during the first predetermined period is greater than or equal to a predetermined count.

5. The integrated circuit of claim 1, wherein the control module is configured to increase the predetermined times at which the wireless network device is transitioned from the inactive mode to the active mode in response to:
a first count of the number of the DTIM beacons missed during the first predetermined period is greater than or equal to a first predetermined count.

6. The integrated circuit of claim 5, wherein the control module is configured to decrease the predetermined times at which the wireless network device is transitioned from the inactive mode to the active mode in response to:
a second count of the number of the DTIM beacons missed during the second predetermined period is greater than the first count.

7. A wireless network device comprising:
the integrated circuit of claim 1; and
an oscillator configured to generate the clock used by the wireless network device while operating in the inactive mode.

8. The wireless network device of claim 7, wherein the wireless network device comprises a client station.

9. A method comprising:
at predetermined times, transitioning a wireless network device from an inactive mode to an active mode, and wherein the predetermined times at which the wireless network is transitioned from the inactive mode to the active mode are based on a clock used by the wireless network device while operating in the inactive mode;
counting a number of delivery traffic indication message (DTIM) beacons missed during each of a first predetermined period and a second predetermined period, wherein the first predetermined period is shorter than the second predetermined period, and wherein the predetermined times at which the wireless network is transitioned from the inactive mode to the active mode do not occur during either of the first predetermined period or the second predetermined period; and
adjusting the predetermined times at which the wireless network device is transitioned from the inactive mode to the active mode based on the number of the DTIM beacons missed during each of i) the first predetermined period and ii) the second predetermined period.

10. The method of claim 9, wherein adjusting the predetermined times at which the wireless network device is transitioned from the inactive mode to the active mode comprises:
adjusting the predetermined times based on a difference between a first timestamp and a second timestamp,
wherein the first timestamp is received from a remote device, and the second timestamp is based on a local clock of the wireless network device.

11. The method of claim 9, wherein the wireless network device comprises a client station.

* * * * *